(12) United States Patent
Wang et al.

(10) Patent No.: US 11,534,820 B2
(45) Date of Patent: Dec. 27, 2022

(54) CRYSTALLIZER COPPER PLATE AND CONTINUOUS CASTING CRYSTALLIZER

(71) Applicant: XIXIA LONGCHENG SPECIAL MATERIAL CO., LTD., Nanyang (CN)

(72) Inventors: Xibin Wang, Nanyang (CN); Jialiang Zhao, Nanyang (CN); Chunyi Liao, Nanyang (CN); Chao Ma, Nanyang (CN); Yi Ren, Nanyang (CN)

(73) Assignee: XIXIA LONGCHENG SPECIAL MATERIAL CO., LTD., Nanyang (CN)

( * ) Notice: Subject to any disclaimer, the term of this patent is extended or adjusted under 35 U.S.C. 154(b) by 0 days.

(21) Appl. No.: 17/428,457

(22) PCT Filed: Jun. 16, 2020

(86) PCT No.: PCT/CN2020/096435
§ 371 (c)(1),
(2) Date: Aug. 4, 2021

(87) PCT Pub. No.: WO2021/098202
PCT Pub. Date: May 27, 2021

(65) Prior Publication Data
US 2022/0105559 A1    Apr. 7, 2022

(30) Foreign Application Priority Data
Nov. 21, 2019  (CN) .......................... 201911145509.4

(51) Int. Cl.
*B22D 11/059*    (2006.01)
*B22D 11/055*    (2006.01)
*B22D 11/124*    (2006.01)

(52) U.S. Cl.
CPC .......... *B22D 11/059* (2013.01); *B22D 11/055* (2013.01); *B22D 11/1243* (2013.01)

(58) Field of Classification Search
CPC .... B22D 11/055; B22D 11/057; B22D 11/059
See application file for complete search history.

(56) References Cited

U.S. PATENT DOCUMENTS

| 3,978,910 | A | * | 9/1976 | Gladwin | ............... | B22D 11/055 |
|---|---|---|---|---|---|---|
| | | | | | | 164/443 |
| 4,009,749 | A | * | 3/1977 | Alberny | ............... | B22D 11/055 |
| | | | | | | 164/443 |
| 2006/0272794 | A1 | * | 12/2006 | Wobker | ............... | B22D 11/055 |
| | | | | | | 164/443 |

FOREIGN PATENT DOCUMENTS

| CN | 1876275 A | 12/2006 |
|---|---|---|
| CN | 201168770 Y | 12/2008 |

(Continued)

OTHER PUBLICATIONS

Machine Translation of Zhao et al (CN 209477242U, Oct. 11, 2019, cited in IDS filed Aug. 4, 2021). (Year: 2019).*

(Continued)

*Primary Examiner* — Kevin E Yoon
*Assistant Examiner* — Jacky Yuen
(74) *Attorney, Agent, or Firm* — Banner & Witcoff, Ltd.

(57) ABSTRACT

A crystallizer copper plate and a continuous casting crystallizer. The crystallizer copper plate is provided with a metal continuous casting die surface and a rear-side cooling fixed surface. The fixed surface is provided with fixing screw holes in a vertical column connected to a fixed water tank or an adapter backplate and mesas forming the surrounding of the screw holes. Reinforced bars are connected between multiple mesas of each column. Cooling channels lower than the fixed surface are provided between any two adjacent two columns of fixing screw holes. Flow-diverting (Continued)

cooling bars are provided at the middle of meniscus regions of the cooling channels. Either the top end or the bottom end of the flow-diverting cooling bar is a cone used for altering the direction of movement of a cooling medium.

18 Claims, 2 Drawing Sheets

(56) References Cited

FOREIGN PATENT DOCUMENTS

| CN | 106670410 A | 5/2017 | | |
|---|---|---|---|---|
| CN | 209477242 U | 10/2019 | | |
| CN | 110666116 A | 1/2020 | | |
| DE | 102007001931 A1 | 3/2008 | | |
| DE | 102018123948 B3 | 9/2019 | | |
| JP | 58061951 A | * | 4/1983 | ........... B22D 11/055 |

OTHER PUBLICATIONS

Aug. 10, 2020 (WO) International Search Report with English Translation—App. PCT/CN2020/096435.
Aug. 15, 2020 (CN) Examination Report of CN Application 140050140003004152.

* cited by examiner

CRYSTALLIZER COPPER PLATE AND CONTINUOUS CASTING CRYSTALLIZER

CROSS-REFERENCE TO RELATED APPLICATION

The present disclosure is a U.S. National Phase Application under 35 U.S.C. § 371 of International Application No. PCT/CN2020/096435, which claims priority to Chinese Patent Application No. 2019111455094 filed on Nov. 21, 2019 with the Chinese Patent Office, and entitled "Crystallizer Copper Plate and Continuous Casting Crystallizer", the contents of which are incorporated herein by reference in entirety.

TECHNICAL FIELD

The present disclosure relates to technical filed of continuous casting crystallizers and, in particular, to a crystallizer copper plate (a copper plate for a crystallizer) and a continuous casting crystallizer.

BACKGROUND ART

A crystallizer copper plate is usually provided with either of close-packed cooling grooves and a one-trough cooling groove. Among them, the close-packed cooling grooves have relatively narrow cooling medium grooves but relatively wide cooling ribs, so that an amount of cooling medium is in contact with a relatively small effective cooling surface, resulting in relatively weak cooling capacity and relatively low continuous casting speed. The one-trough cooling groove has a smaller total heat exchange area due to the lack of cooling ribs. Although the continuous casting speed is higher than that of the close-packed cooling grooves, it still does not meet the requirements of modern industrial production.

In view of this, the present disclosure is hereby proposed.

SUMMARY

The object of the present disclosure includes, for example, providing a crystallizer copper plate that has a stronger cooling capacity.

The object of the present disclosure also includes, for example, providing a continuous casting crystallizer, which can achieve more uniform cooling and is beneficial to reduce cracks of the crystallizer copper plate caused by thermal fatigue and prolong the service life of the crystallizer copper plate.

The technical solutions of the present disclosure are described as follows.

In a first aspect, the present disclosure provides a crystallizer copper plate, which has a die surface for metal continuous casting and a fixed surface for back cooling, wherein the fixed surface is provided with fixing screw holes and bosses, wherein the fixing screw holes are, in vertical columns, connected to a fixed water tank or an adapter backplate, and the bosses are formed around the screw holes. Reinforcing ribs are connected among the plurality of bosses in each column. A cooling channel lower than the fixed surface is provided between any two adjacent columns of fixing screw holes. A flow-dividing cooling rib is provided along the middle of a meniscus region of the cooling channel. At least one of a top end and a bottom end of the flow-dividing cooling rib is provided as a conical corner for altering the direction of movement of a cooling medium.

In one or more embodiments, the crystallizer copper plate is in a cuboid plate-shaped structure.

In one or more embodiments, the fixing screw holes are counterbores.

In one or more embodiments, the fixing screw holes are counterbores provided with threads.

In one or more embodiments, the crystallizer copper plate further includes top surface and bottom surface opposite to each other and two opposite side surfaces.

In one or more embodiments, an opening is provided at a position of the crystallizer copper plate close to the top surface or the bottom surface and corresponding to a water inlet of the fixed water tank or the adapter backplate, and an opening is provided at a position of the crystallizer copper plate close to the bottom surface or the top surface and corresponding to a water outlet of the fixed water tank or the adapter backplate.

In one or more embodiments, the second fixing screw hole counted from top to bottom in any column is used as a regional hole, and a line connecting a center of the regional hole and an apex of the conical corner is partially located on a tapered surface of the conical corner.

In one or more embodiments, the conical corner has an angle of 60 to 90°.

In one or more embodiments, the flow-dividing cooling rib is in the shape of a straight strip.

In one or more embodiments, the flow-dividing cooling rib has a width of 6 to 10 mm.

In one or more embodiments, the bottom of the cooling channel is lower than the fixed surface by 5 to 15 mm.

In one or more embodiments, the fixing screw holes and the bosses are located on the same horizontal plane as the fixed surface.

In one or more embodiments, the reinforcing rib has a width of 5 to 8 mm.

In one or more embodiments, the width of the reinforcing rib is smaller than the width of the flow-dividing cooling rib.

In a second aspect, the present disclosure provides a continuous casting crystallizer, comprising the crystallizer copper plate as described in any one of the foregoing embodiments.

The present disclosure includes the following beneficial effects. For example, in the present disclosure, a flow-dividing cooling rib is arranged along the middle of a meniscus region of a cooling channel. The provision of the cooling ribs favors an increase in the cooling area of the meniscus regions, reduces the cross-section area of the cooling channels, increases the speed of a cooling water flow, and enhances cooling capacity, which helps to reduce the temperature of the copper plate in the meniscus region, helps to achieve more uniform cooling in the meniscus region, helps to reduce thermal fatigue cracks of the copper plate in the meniscus region, and prolongs the service life of the crystallizer copper plate. When a cooling medium flowing in the cooling channel moves to the meniscus region, the water flow channel becomes narrower due to the provision of the flow-dividing cooling rib, water flows at a higher rate, the heat exchange area is increased, and stronger cooling capacity is obtained, which helps to reduce the temperature of the copper plate in the meniscus region, helps to achieve more uniform cooling in the meniscus region, and helps to reduce thermal fatigue cracks of the copper plate in the meniscus region. In the present disclosure, at least one of the top end and the bottom end of the flow-dividing cooling rib is provided as a conical corner. In this way, when water flow collides with the conical corner, the water flow can alter its direction, so that the water flow rushes to the second fixing screw hole counted from top to bottom and to the boss forming the surrounding of the screw hole, and thus turbulence is formed here, thereby improving the cooling effect here. Stronger cooling capacity is obtained, and the cooling of the crystallizer copper plate has a relatively uniform cooling distribution. A cast billet can be cooled by strong capacity and also cooled uniformly with low stress in the billet shell, and the continuous casting speed can be increased accordingly. Furthermore, the provision of the reinforcing ribs in the present disclosure enhances the strength between the bosses on the one hand and also can increase the heat exchange capacity. They also have the effect of narrowing the water channel of the fixed surface and increasing the flow rate to obtain a better cooling effect. In addition, a continuous casting crystallizer according to the present disclosure can achieve more uniform cooling, which is beneficial to reduce thermal fatigue cracks of the crystallizer copper plate and prolong the service life of the crystallizer copper plate.

BRIEF DESCRIPTION OF DRAWINGS

In order to more clearly illustrate the technical solutions of the embodiments of the present disclosure, accompanying drawings which need to be used in the embodiments will be introduced briefly below. It should be understood that the following accompanying drawings only show some embodiments of the present disclosure and therefore should not be seen as a limitation of scope. Those ordinarily skilled in the art still could obtain other relevant drawings in light of these accompanying drawings, without any inventive efforts.

Figure 1:
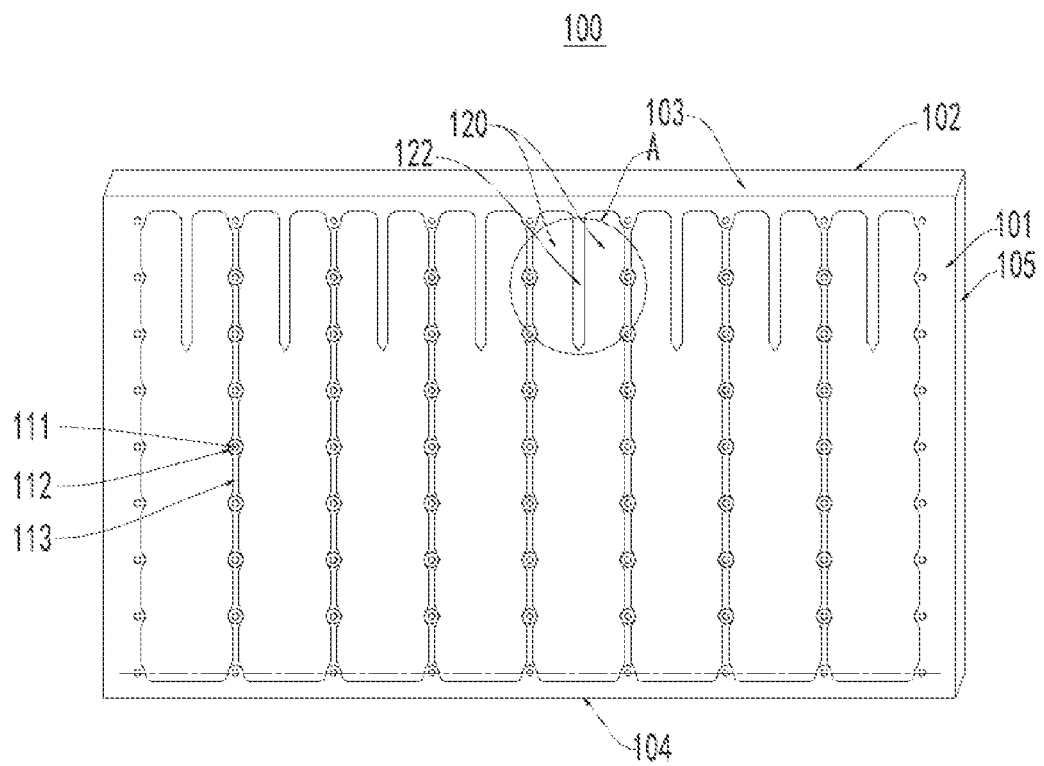
FIG. 1 is a structural schematic view of a crystallizer copper plate according to an embodiment of the present disclosure.

Reference Numerals: 100—crystallizer copper plate; 101—fixed surface; 102—die surface; 103—top surface; 104—bottom surface; 105—side surface; 111—fixing screw hole; 112—boss; 113—reinforcing rib; 114—regional hole; 120—cooling channel; 121—meniscus region; 122—flow-dividing cooling rib; 123—conical corner; 124—apex; 125—tapered surface.

DETAILED DESCRIPTION OF EMBODIMENTS

In order to further clarify the objects, technical solutions, and advantages of the embodiments of the present disclosure, the technical solutions in the embodiments of the present disclosure will be described clearly and completely below with reference to the accompanying drawings in the embodiments of the present disclosure. Obviously, the described embodiments are some of the embodiments of the present disclosure, but not all of the embodiments. Generally, the components of the embodiments of the present disclosure described and shown in the drawings herein may be arranged and designed in various different configurations.

Therefore, the following detailed description of the embodiments of the present disclosure provided in the accompanying drawings is not intended to limit the claimed scope of the present disclosure, but merely represents selected embodiments of the present disclosure. All other embodiments obtained by those ordinary skilled in the art based on the embodiments of the present disclosure, without making inventive effort, fall within the claimed scope of the present disclosure.

It should be noted that similar reference numerals and letters indicate similar items in the following accompanying drawings. Therefore, once a certain item is defined in one drawing, it may not be further defined and explained in the subsequent drawings.

In the description of the present disclosure, it should be noted that the orientation or positional relationship indicated by the terms "upper", "lower", "inner", "outer", and the like, if present, are based on the orientation or positional relationship as shown in the accompanying drawings, or the orientation or positional relationship where the product of the invention is usually placed in use, merely for facilitating the description of the present disclosure and simplifying the description, rather than indicating or implying that related devices or elements have to be in the specific orientation, or configured or operated in a specific orientation, therefore, they should not be construed as limitations on the present disclosure. Besides, terms "first", "second" and the like, if present, are merely for distinguishing the description, but should not be construed as indicating or implying relative importance.

In addition, the term "horizontal", "vertical", "overhanging", or the like does not mean that the component is required to be absolutely horizontal or overhanging, but it may be slightly inclined. For example, the term "horizontal" only means that its direction is more horizontal than "vertical", it does not mean that the structure must be completely horizontal, but it may be slightly inclined.

In the description of the present disclosure, it should be noted that, unless otherwise definitely specified and defined, the terms "provide", "mount", "link", and "connect" should be understood in a broad sense. For example, a connection may be fixed connection, detachable connection, or integrated connection, may be mechanical connection or electrical connection, may be direct attachment or indirect attachment via an intermediate medium or internal communication between two components. For those ordinarily skilled in the art, the specific meanings of the above terms in the present disclosure can be understood according to the specific situation.

It should be noted that, in the case of no conflict, the features in the embodiments of the present disclosure can be combined with each other.

Figure 2:
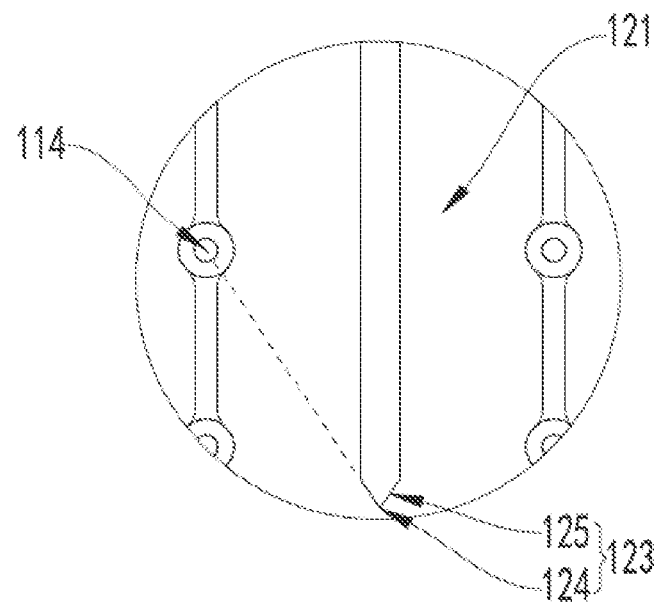
FIG. 2 is a partial enlarged view of A in FIG. 1.

Referring to FIG. 1 and FIG. 2, the present disclosure provides a crystallizer copper plate 100, which is a cuboid plate-shaped structure, and includes fixed surface 101 and die surface 102 opposite to each other, top surface 103 and bottom surface 104 opposite to each other, and two opposite side surfaces 105.

Here, the fixed surface 101 is configured to be connected to a fixed water tank or an adapter backplate to achieve back cooling, and the die surface 102 is configured to perform continuous casting for a metal.

The fixed surface 101 is provided with multiple columns of fixing screw holes 111 configured to connect the external fixed water tank or the adapter backplate and bosses 112 forming the surroundings of the screw holes, wherein the fixing screw holes 111 and the bosses 112 are located on the same horizontal plane as the fixed surface 101. In other words, the fixing screw holes 111 of the present disclosure are counterbores. More specifically, the fixing screw holes 111 of the present disclosure are counterbores provided with threads (i.e., threaded holes). The provision of the counterbores can ensure that the fixed surface 101 is more tightly connected with the fixed water tank or the adapter backplate. Also, when the crystallizer copper plate 100 needs to be removed or replaced, the fixed surface 101 can be easily separated from the fixed water tank or the adapter backplate through the counterbores provided with threads, thereby facilitating maintenance or repair of the crystallizer copper plate 100.

Optionally, reinforcing ribs 113 are connected among the plurality of fixing screw holes 111 in each column. Specifically, a reinforcing rib 113 is connected between any two adjacent fixing screw holes 111 among the plurality of fixing screw holes 111 in each column, and the connection between the reinforcing rib 113 and the two fixing screw holes 111 includes, but is not limited to, fixed connection, such as welding or bonding, or detachable connection. In the present embodiment, the width of the reinforcing rib 113 is 5 to 8 mm. On the one hand, the provision of the reinforcing ribs 113 enhances the strength between the bosses 112 so that the fixed surface 101 is more tightly connected with the fixed water tank or the adapter backplate. Moreover, the heat exchange capacity can be increased. They also serve to narrow the water channel of the fixed surface 101, thereby improving the flow rate to obtain a better cooling effect. Specifically, when a cooling medium is flowing in the cooling channel, the water flow channel becomes narrow due to the provision of the reinforcing ribs 113, water flows at a higher flow rate, and also the heat exchange area is increased, so as to obtain stronger cooling capacity.

A cooling channel 120 is provided between any two adjacent columns of fixing screw holes 111. The cooling channel 120 in the present disclosure is recessed in the fixed surface 101. Specifically, the bottom of the cooling channel 120 is about 5 to 15 mm lower than the fixed surface 101. The cooling channel 120 is used for allowing the cooling medium to flow therein. In a specific example, an opening is provided at a position of the crystallizer copper plate 100 close to the top surface 103 or bottom surface 104 and corresponding to the water inlet of the fixed water tank or the adapter backplate, and an opening is provided at a position of the crystallizer copper plate 100 close to the bottom surface 104 or top surface 103 and corresponding to the water outlet of the fixed water tank or the adapter backplate. Therefore, water can be fed into the opening of the crystallizer copper plate 100 close to the top surface 103 or bottom surface 104 and corresponding to the water inlet of the fixed water tank or the adapter backplate, and correspondingly, water can be discharged from the opening close to the bottom surface 104 or top surface 103 and corresponding to the water outlet of the fixed water tank or the adapter backplate, so as to form circulating water for cooling.

A meniscus region 121 is provided in the cooling channel 120. Generally, a region of the crystallizer copper plate 100 where the second row of fixing screw holes 111 and bosses 112 in the direction from the top surface 103 to the bottom surface 104 are located is called the meniscus region 121. The initial solidification of molten steel in the meniscus region 121 is a key factor that determines the surface quality and internal quality of a cast billet. Therefore, the meniscus region 121 needs to be cooled sufficiently and uniformly.

Specifically, in the present disclosure, the meniscus region 121 is provided with a flow-dividing cooling rib 122. At least one end of the top end and bottom end of the flow-dividing cooling rib 122 is provided as a conical corner 123 for altering the direction of movement of the cooling medium.

The flow-dividing cooling rib 122 is in a straight strip structure. The straight strip structure is provided such that, after the cooling medium (such as water) turns around at the conical corner 123, it is no longer affected by the flow-dividing cooling rib 122 in the subsequent movement. In addition, in the present disclosure, the width of the flow-dividing cooling rib 122 is 6 to 10 mm, and the width of the reinforcing rib 113 is smaller than the width of the flow-dividing cooling rib 122. In this way, the water channel region of the cooling channel 120 can be enlarged as much as possible while the size of the fixed surface 101 remains unchanged, thereby the cooling area of the water flow is increased, so that the water flow has a lower flow rate in other regions of the cooling channel 120 (i.e., regions other than the meniscus region 121), and the water flow has a higher flow rate in the meniscus region 121. In the present disclosure, by arranging the flow-dividing cooling rib 122 only in the meniscus region 121 and not in other regions of the cooling channel 120 (i.e., regions other than the meniscus region 121), the water channel of the meniscus region 121 becomes narrow, so that water flows at a higher flow rate, the heat exchange area is increased, and the cooling capacity is stronger. This helps to reduce the temperature of the copper plate in the meniscus region 121, helps to achieve more uniform cooling in the meniscus region 121, and helps to reduce the formation of thermal fatigue cracks of the copper plate in the meniscus region 121. In the present disclosure, at least one end of the top end and bottom end of the flow-dividing cooling rib 122 is designed as a conical corner 123. When water flow collides with the conical corner 123, the water flow can alter its direction, thereby forming a disorderly turbulence in which the water flows are mixed with each other, so as to improve the cooling effect.

Specifically, the flow-dividing cooling rib 122 provided in the meniscus region 121 can narrow the water channel of the meniscus region 121, so that when the cooling medium (such as water) flows through the meniscus region 121, the flow rate of the cooling medium becomes higher, resulting in a stronger cooling capacity and better cooling effect. Also, the provision of the flow-dividing cooling rib 122 can effectively increase the heat exchange area, so that the cooling capacity is further strengthened, and the cooling is more uniform. The rapid and uniform cooling can help to reduce the formation of thermal fatigue cracks of the copper plate in the meniscus region 121.

Further, at least one end of the top end and bottom end of the flow-dividing cooling rib 122 is designed as a conical corner 123. In other words, one end of the flow-dividing cooling rib 122 close to the top surface 103 is configured as a conical corner 123, or one end of the flow-dividing cooling rib 122 close to the bottom surface 104 is configured as a conical corner 123, or both ends of the flow-dividing cooling rib 122 are configured as conical corners 123. When the cooling medium (such as water) flows through the meniscus region 121, after the cooling medium collides with the conical corner 123, its flow rate increases and flow direction changes from order to disorder, so that turbulence (i.e., turbulent flow) can be formed in the meniscus region 121 to further increase the cooling rate and improve the cooling effect.

Optionally, in the present disclosure, the second fixing screw hole 111 counted from top to bottom in any column is defined as a regional hole 114. A line connecting the center of the regional hole 114 and the apex 124 of the conical corner 123 is partially located on the tapered surface 125 of the conical corner 123 (as shown by the dotted line in FIG. 2). Specifically, the conical corner 123 in the present disclosure has an angle of 60 to 90°. The angle allows the water flow to flow along the tapered surface 125 of the conical corner 123 and then impact on the boss 112 corresponding to the regional hole 114. It can be ensured, by restricting the shapes of the regional hole 114 and the conical corner 123, that when the water flow collides with the conical corner 123, the water flow alters its direction and impacts on the boss 112 of the regional hole 114, and turbulence is generated here, whereby the cooling capacity of the boss 112 corresponding to the regional hole 114 is effectively improved, so that the meniscus region 121 is cooled more uniformly and a better cooling effect is obtained. The temperature of the hot surface of the crystallizer copper plate 100 in the meniscus region 121 is reduced, thereby reducing or eliminating thermal fatigue cracks of the copper plate in the meniscus region 121, so that the crystallizer copper plate 100 has a prolonged service life and can withstand a higher continuous casting speed.

In addition, the present disclosure also provides a continuous casting crystallizer, which includes the crystallizer copper plate 100 described above. It can achieve more uniform cooling, which is beneficial to reduce thermal fatigue cracks of the crystallizer copper plate 100 and prolongs the service life of the crystallizer copper plate 100.

According to a crystallizer copper plate 100 provided in the present disclosure, the working principle of the crystallizer copper plate 100 is described as follows. The crystallizer copper plate 100 is fixed by connecting the fixing screw holes 111 in the fixed surface 101 and bosses 112 forming the surroundings of the screw holes to an external fixed water tank or adapter backplate, and then the outer periphery of the fixed surface 101 is sealed by using a sealing ring to effectively avoid the outflow of the cooling medium. The provision of reinforcing ribs 113 in the present disclosure can not only strengthen the strength between the bosses 112, but also increase the heat exchange capacity and achieve a better cooling effect. Then, the cooling medium is introduced into the cooling channel 120, and the cooling medium flows in the cooling channel 120. When it moves to the meniscus region 121, the water flow channel becomes narrow due to the provision of the flow-dividing cooling rib 122, water flows at a higher flow rate, the heat exchange area is increased, and stronger cooling capacity is obtained. Therefore, the provision of the flow-dividing cooling rib 122 helps to reduce the temperature of the copper plate in the meniscus region 121, helps to achieve more uniform cooling in the meniscus region 121, and helps to reduce thermal fatigue cracks of the copper plate in the meniscus region 121. In the present disclosure, at least one end of the top end and bottom end of the flow-dividing cooling rib 122 is designed as a conical corner 123. When water flow collides with the conical corner 123, the water flow can alter its direction, so that the water flow rushes to the second fixing screw hole 111 counted from top to bottom and to the boss 112 forming the surrounding of the screw hole, and turbulence is formed here, thereby improving the cooling effect here. Stronger cooling capacity for the crystallizer copper plate 100 is obtained, and relatively uniform cooling can be achieved. Moreover, a cast billet can be cooled by strong capacity and also cooled uniformly with low stress in the billet shell, and the continuous casting speed can be increased accordingly.

The description will be given below in connection with specific embodiments. Referring to FIG. 1, the present embodiment provides a crystallizer copper plate 100 that is in a cuboid plate-shaped structure, which includes opposite fixed surface 101 and die surface 102, opposite top surface 103 and bottom surface 104, and two opposite side surfaces 105.

Here, the fixed surface 101 is provided with multiple columns of fixing screw holes 111 and bosses 112 forming the surroundings of the screw holes, and the fixing screw holes 111 and the bosses 112 are located on the same horizontal plane as the fixed surface 101. Reinforcing ribs 113 are connected among the plurality of fixing screw holes 111 in each column. In the present embodiment, the reinforcing rib 113 has a width of 5 mm.

A cooling channel 120 recessed in the fixed surface 101 is provided between any two adjacent columns of fixing screw holes 111. The bottom of the cooling channel 120 is about 8 mm lower than the fixed surface 101. The cooling medium enters an opening of the crystallizer copper plate 100 close to the bottom surface 104 and corresponding to the water inlet of the fixed water tank or the adapter backplate, flows through the cooling channel 120, and then is discharged from an opening close to the top surface 103 and corresponding to the water outlet of the fixed water tank or the adapter backplate. A meniscus region 121 is provided in the cooling channel 120, and a straight-strip-shaped flow-dividing cooling rib 122 with a width of 7 mm is provided on a portion of the cooling channel 120 corresponding to the meniscus region 121. The bottom end of the flow-dividing cooling rib 122 is provided with a conical corner 123 with an angle of 60° protruding along the axial direction of the flow-dividing cooling rib 122. In the present disclosure, the second fixing screw hole 111 counted from top to bottom in any column is defined as a regional hole 114, and a line connecting the center of the regional hole 114 and the apex 124 of the conical corner 123 is partially located on the tapered surface 125 of the conical corner 123.

Figure 3:
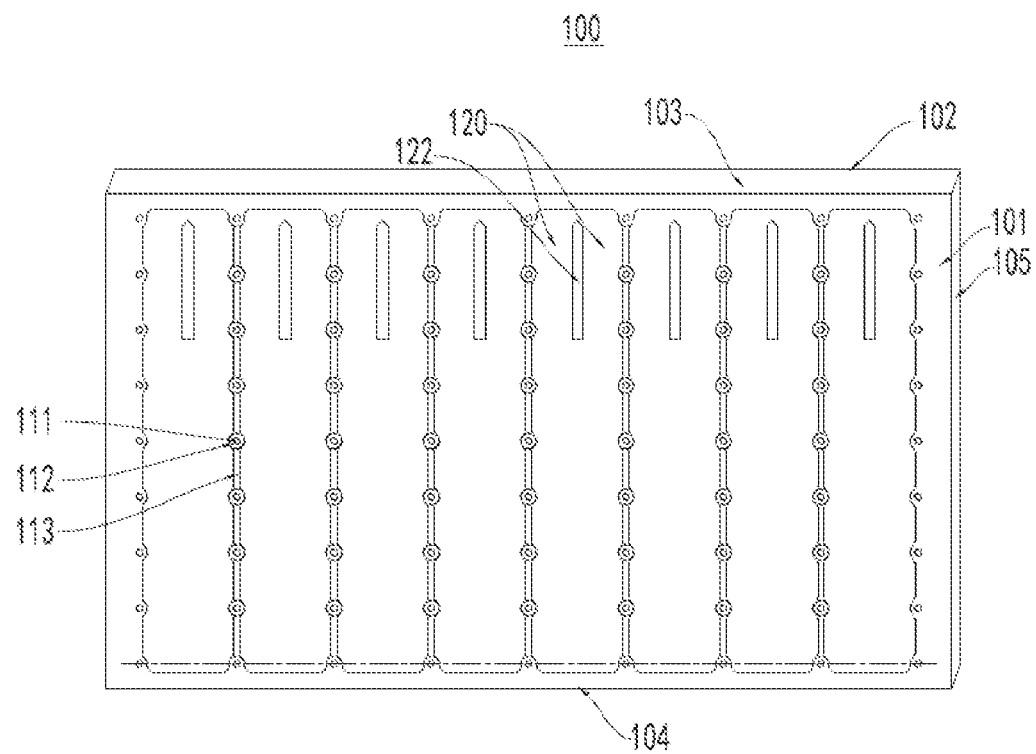
FIG. 3 is a structural schematic view of a crystallizer copper plate according to an embodiment of the present disclosure.

When the cooling medium flows in the cooling channel 120, the conical corner 123 causes the water flow to change its flow direction and impact on the boss 112 of the regional hole 114 and generate turbulence there, thereby effectively improving the cooling capacity of the boss 112 corresponding to the regional hole 114, so that more uniform cooling is achieved in the meniscus region 121. The temperature of the hot surface of the crystallizer copper plate 100 in the meniscus region 121 is reduced, thereby reducing or eliminating thermal fatigue cracks of the copper plate in the meniscus region 121, so that the crystallizer copper plate 100 has a prolonged service life and can withstand a higher continuous casting speed. With continued reference to FIG. 3, the present embodiment provides a crystallizer copper plate 100 that is a cuboid plate-shaped structure, which includes opposite fixed surface 101 and die surface 102, opposite top surface 103 and bottom surface 104, and two opposite side surfaces 105.

Here, the fixed surface 101 is provided with multiple columns of fixing screw holes 111 and bosses 112 forming the surroundings of the screw holes, and the fixing screw holes 111 and the bosses 112 are located on the same horizontal plane as the fixed surface 101. Reinforcing ribs 113 are connected among the plurality of fixing screw holes 111 in each column. In the present embodiment, the reinforcing rib 113 has a width of 8 mm.

A cooling channel 120 recessed in the fixed surface 101 is provided between any two adjacent columns of fixing screw holes 111. The bottom of the cooling channel 120 is about 15 mm lower than the fixed surface 101. The cooling medium enters an opening of the crystallizer copper plate 100 close to the top surface 103 and corresponding to the water inlet of the fixed water tank or the adapter backplate, flows through the cooling channel 120, and then is discharged from an opening close to the bottom surface 104 and corresponding to the water outlet of the fixed water tank or the adapter backplate. A meniscus region 121 is provided in the cooling channel 120, and a straight-strip-shaped flow-dividing cooling rib 122 with a width of 10 mm is provided on a portion of the cooling channel 120 corresponding to the meniscus region 121. The top end of the flow-dividing cooling rib 122 is provided with a conical corner 123 with an angle of 90° protruding along the axial direction of the flow-dividing cooling rib 122. In the present disclosure, the second fixing screw hole 111 counted from top to bottom in any column is defined as a regional hole 114, and a line connecting the center of the regional hole 114 and the apex 124 of the conical corner 123 is partially located on the tapered surface 125 of the conical corner 123.

Figure 4:
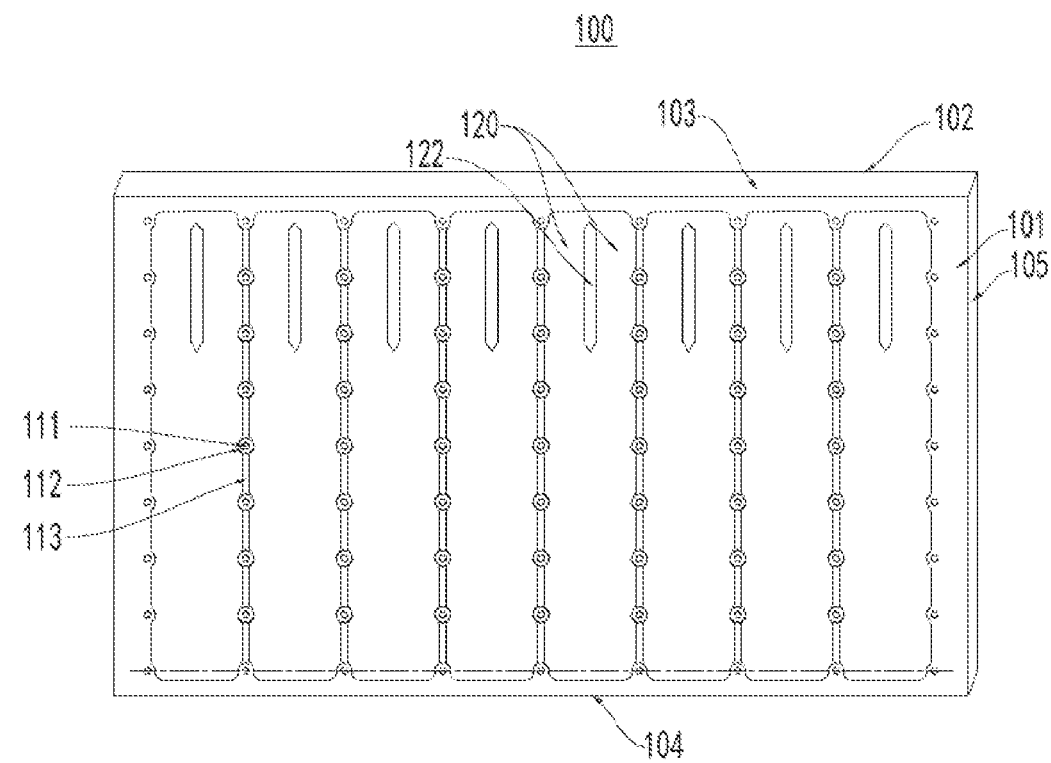
FIG. 4 is a structural schematic view of a crystallizer copper plate according to an embodiment of the present disclosure.

When the cooling medium flows in the cooling channel 120, the conical corner 123 causes the water flow to change its flow direction and impact on the boss 112 of the regional hole 114 and generate turbulence here, thereby effectively improving the cooling capacity of the boss 112 corresponding to the regional hole 114, so that more uniform cooling is achieved in the meniscus region 121. The temperature of the hot surface of the crystallizer copper plate 100 in the meniscus region 121 is reduced, thereby reducing or eliminating thermal fatigue cracks of the copper plate in the meniscus region 121, so that the crystallizer copper plate 100 has a prolonged service life and can withstand a higher continuous casting speed. Referring to FIG. 4, the present embodiment provides a crystallizer copper plate 100 that is a cuboid plate-shaped structure, which includes opposite fixed surface 101 and die surface 102, opposite top surface 103 and bottom surface 104, and two opposite side surfaces 105.

Here, the fixed surface 101 is provided with multiple columns of fixing screw holes 111 and bosses 112 forming the surroundings of the screw holes, and the fixing screw holes 111 and the bosses 112 are located on the same horizontal plane as the fixed surface 101. Reinforcing ribs 113 are connected among the plurality of fixing screw holes 111 in each column. In the present embodiment, the reinforcing rib 113 has a width of 6 mm.

A cooling channel 120 recessed in the fixed surface 101 is provided between any two adjacent columns of fixing screw holes 111. The bottom of the cooling channel 120 is about 12 mm lower than the fixed surface 101. The cooling medium enters an opening of the crystallizer copper plate 100 close to the bottom surface 104 and corresponding to the water inlet of the fixed water tank or the adapter backplate, flows through the cooling channel 120, and then is discharged from an opening close to the top surface 103 and corresponding to the water outlet of the fixed water tank or the adapter backplate. A meniscus region 121 is provided in the cooling channel 120, and a straight-strip-shaped flow-dividing cooling rib 122 with a width of 8 mm is provided on a portion of the cooling channel 120 corresponding to the meniscus region 121. The bottom end and top end of the flow-dividing cooling rib 122 are both provided with conical corners 123 with an angle of 80° protruding along the axial direction of the flow-dividing cooling rib 122. In the present disclosure, the second fixing screw hole 111 counted from top to bottom in any column is defined as a regional hole 114, and a line connecting the center of the regional hole 114 and the apex 124 of the conical corner 123 is partially located on the tapered surface 125 of the conical corner 123.

When the cooling medium flows in the cooling channel 120, the conical corner 123 causes the water flow to change its flow direction and impact on the boss 112 of the regional hole 114 and generate turbulence there, thereby effectively improving the cooling capacity of the boss 112 corresponding to the regional hole 114, so that more uniform cooling is achieved in the meniscus region 121. The temperature of the hot surface of the crystallizer copper plate 100 in the meniscus region 121 is reduced, thereby reducing or eliminating thermal fatigue cracks of the copper plate in the meniscus region 121, so that the crystallizer copper plate 100 has a prolonged service life and can withstand a higher continuous casting speed.

In conclusion, in the present disclosure, the crystallizer copper plate 100 is fixed by connecting the fixing screw holes 111 in the fixed surface 101 and bosses 112 forming the surroundings of the screw holes to an external fixed water tank or adapter backplate, and then the outer periphery of the fixed surface 101 is sealed by using a sealing ring to effectively avoid the outflow of the cooling medium. The provision of reinforcing ribs 113 in the present disclosure can not only strengthen the strength between the bosses 112, but also increase the heat exchange capacity and achieve a better cooling effect. Then, the cooling medium is introduced into the cooling channel 120, and the cooling medium flows in the cooling channel 120. When it moves to the meniscus region 121, the water flow channel becomes narrower due to the provision of the flow-dividing cooling rib 122, water flows at a higher flow rate, the heat exchange area is increased, and stronger cooling capacity is obtained. This helps to expand the cooling area of the meniscus regions 121, reduces the cross-section area of the cooling channel 120, increases the speed of a cooling water flow, and enhances cooling capacity. Therefore, the provision of the flow-dividing cooling rib 122 helps to reduce the temperature of the copper plate in the meniscus region 121, helps to achieve more uniform cooling in the meniscus region 121, helps to reduce thermal fatigue cracks of the copper plate in the meniscus region 121, and prolongs the service life of the crystallizer copper plate 100. In the present disclosure, at least one end of the top end and bottom end of the flow-dividing cooling rib 122 is provided with a conical corner 123. When water flow collides with the conical corner 123, the water flow can alter its direction, so that the water flow rushes to the second fixing screw hole 111 counted from top to bottom and to the boss forming the surrounding of the screw hole, and turbulence is formed here, thereby improving the cooling effect here. Stronger cooling capacity for the crystallizer copper plate 100 is obtained, and relatively uniform cooling can be achieved. Moreover, a cast billet can be cooled with strong capacity and also cooled uniformly with low stress in the billet shell, and the continuous casting speed can be increased accordingly.

The above description is merely illustrative of specific embodiments of the present disclosure, but the protection scope of the present disclosure is not limited thereto. Any changes or substitutions that can be readily envisaged by those skilled in the art within the technical scope disclosed in the present disclosure should be covered within the protection scope of the present disclosure.

INDUSTRIAL APPLICABILITY

The crystallizer copper plate according to the present disclosure is provided with a flow-dividing cooling rib along the middle of a meniscus region of a cooling channel, which favors an increase in the cooling area of the meniscus region, reduces the cross-section area of the cooling channel, increases the speed of a cooling water flow, and enhances cooling capacity. This helps to reduce the temperature of the copper plate in the meniscus region, helps to achieve more uniform cooling in the meniscus region, helps to reduce thermal fatigue cracks of the copper plate in the meniscus region, and prolongs the service life of the crystallizer copper plater. In addition, a continuous casting crystallizer according to the present disclosure can achieve more uniform cooling, which is beneficial to reduce thermal fatigue cracks of the crystallizer copper plate and prolongs the service life of the crystallizer copper plate.

What is claimed is:

1. A crystallizer copper plate, wherein the crystallizer copper plate has a die surface for metal continuous casting and a fixed surface for back cooling, wherein the fixed surface is provided with fixing screw holes and bosses, wherein the fixing screw holes are, in vertical columns, connected to a fixed water tank or an adapter backplate, and the bosses are formed around the screw holes, wherein reinforcing ribs are connected between a plurality of bosses in each column, a cooling channel lower than the fixed surface is provided between any two adjacent columns of the fixing screw holes, a flow-dividing cooling rib is provided along a middle of a meniscus region of the cooling channel, and at least one of a top end and a bottom end of the flow-dividing cooling rib is provided as a conical corner for altering a direction of movement of a cooling medium; wherein the second fixing screw hole from top to bottom in any column is used as a regional hole, and a line connecting a center of the regional hole and an apex of the conical corner is partially located on a tapered surface of the conical corner.

2. The crystallizer copper plate according to claim 1, wherein the crystallizer copper plate is in a cuboid plate-shaped structure.

3. The crystallizer copper plate according to claim 1, wherein the fixing screw holes are counterbores.

4. The crystallizer copper plate according to claim 1, wherein the fixing screw holes are counterbores provided with threads.

5. The crystallizer copper plate according to claim 1, wherein the crystallizer copper plate further comprises a top surface and a bottom surface opposite to each other and two opposite side surfaces.

6. The crystallizer copper plate according to claim 5, wherein an opening is provided at a position of the crystallizer copper plate close to the top surface or the bottom surface and corresponding to a water inlet of the fixed water tank or the adapter backplate, and an opening is provided at a position of the crystallizer copper plate close to the bottom surface or the top surface and corresponding to a water outlet of the fixed water tank or the adapter backplate.

7. The crystallizer copper plate according to claim 1, wherein the conical corner has an angle of 60 to 90°.

8. The crystallizer copper plate according to claim 1, wherein the flow-dividing cooling rib is in a shape of a straight strip.

9. The crystallizer copper plate according to claim 1, wherein the flow-dividing cooling rib has a width of 6 to 10 mm.

10. The crystallizer copper plate according to claim 1, wherein a bottom of the cooling channel is lower than the fixed surface by 5 to 15 mm.

11. The crystallizer copper plate according to claim 1, wherein the fixing screw holes and the bosses are located on the same horizontal plane as the fixed surface.

12. The crystallizer copper plate according to claim 1, wherein the reinforcing rib has a width of 5 to 8 mm.

13. The crystallizer copper plate according to claim 1, wherein a width of the reinforcing rib is smaller than a width of the flow-dividing cooling rib.

14. A continuous casting crystallizer, comprising the crystallizer copper plate according to claim 1.

15. The crystallizer copper plate according to claim 2, wherein the fixing screw holes are counterbores.

16. The crystallizer copper plate according to claim 2, wherein the fixing screw holes are counterbores provided with threads.

17. The crystallizer copper plate according to claim 2, wherein the crystallizer copper plate further comprises a top surface and a bottom surface opposite to each other and two opposite side surfaces.

18. The crystallizer copper plate according to claim 2, wherein the conical corner has an angle of 60 to 90°.

* * * * *